United States Patent [19]

Mason

[11] Patent Number: 4,653,465
[45] Date of Patent: Mar. 31, 1987

[54] HEATER

[76] Inventor: Rufus C. Mason, Rte. 10, Box 149 A., Columbus, Miss. 39702

[21] Appl. No.: 891,388

[22] Filed: Jul. 31, 1986

[51] Int. Cl.⁴ .......................... F24H 3/06; F24C 15/28
[52] U.S. Cl. ..................................... 126/99 R; 126/83; 126/110 R; 126/110 B; 126/61; 237/53
[58] Field of Search ......... 432/223; 126/99 R, 110 R, 126/110 B, 61, 83, 121; 237/53

[56] References Cited

U.S. PATENT DOCUMENTS

| | | | |
|---|---|---|---|
| 4,047,515 | 9/1977 | Daniel | 126/110 R |
| 4,060,196 | 11/1977 | Goldsby et al. | 126/121 |
| 4,194,487 | 3/1980 | Cadwallader et al. | 126/61 |
| 4,201,186 | 5/1980 | Paquin | 126/83 |
| 4,206,743 | 6/1980 | Niemela | 126/110 B |
| 4,217,876 | 8/1980 | Gee | 126/99 R |
| 4,319,557 | 3/1982 | Sietmann et al. | 126/110 R |
| 4,361,131 | 11/1982 | Homolik | 126/61 |

*Primary Examiner*—Henry C. Yuen
*Attorney, Agent, or Firm*—L. S. Van Landingham, Jr.

[57] ABSTRACT

A heater for combustion of carbonaceous fuels comprising a casing which surrounds and contains the fuel immediately prior to and during combustion and a heat exchanger of unique design which is positioned within the casing. The efficiency of the heater may be increased by providing an improved system for supplying pre-heated secondary air for more complete combustion of partially combusted fuel in the general vicinity of and/or within the heat exchanger. The heater may be of the self-feeding type for combustion of solid fuels such as wood and, in this embodiment, preferably the casing is generally cylindrical and the heat exchanger is approximately centrally located within the casing whereby it extends generally along the casing axis and is spaced a substantial distance from the casing wall.

22 Claims, 8 Drawing Figures

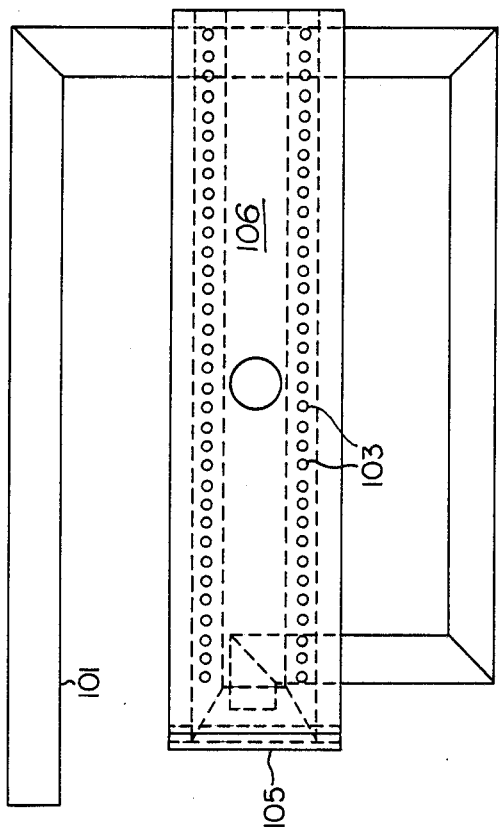
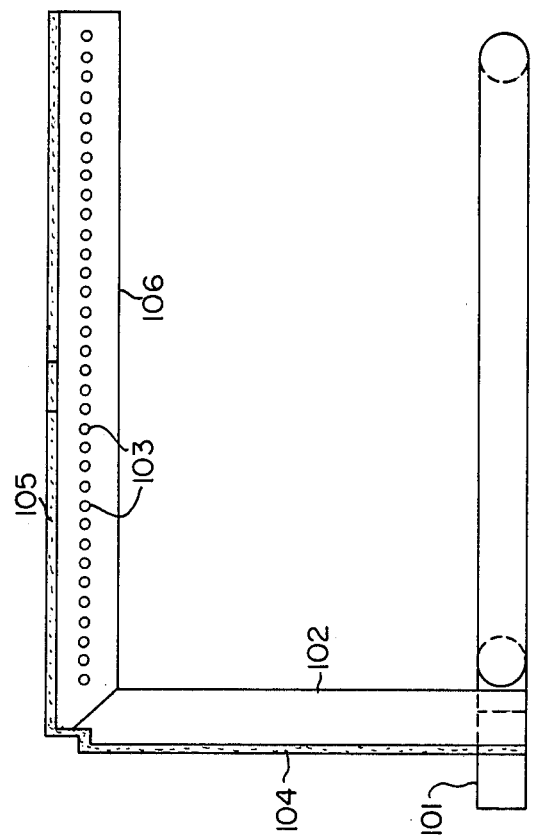
FIG. 7
FIG. 8

HEATER

THE BACKGROUND OF THE INVENTION

1. The Field Of The Invention

The present invention relates to heaters useful for the combustion of solid, liquid and gaseous carbonaceous fuels. In one of its more specific embodiments, the invention is concerned with improvements in heat exchangers for use in heaters of this type. The invention is further concerned with an improved system for supplying a heated secondary air source to heaters of the aforesaid type to thereby aid in increasing their efficiency.

2. The Prior Art

In the interest of simplifying the disclosure, the heaters discussed hereinafter will be of the type commonly used for burning solid fuels such as wood. However, it is understood that solid, liquid, liquefiable and gaseous carbonaceous fuels of other types may be used, including, for example, anthracite, bituminous and lignite coals, peat, fuel oils of all types derived from petroleum and renewable sources such as vegetable and animal oils, liquefied normally gaseous fuels such as propane, butane and the like, and natural and artificial gas.

Wood heaters have been in existence for many years and numerous innovations and adaptations have been proposed in an attempt to improve their characteristics. For instance, it has long been known that wood heaters are not as efficient as is desirable. When wood burns in a heater, it releases volatile matter during a first stage of the burning process and then the volatiles burn during the second stage while the solid charcoal remaining from the first stage continues to burn. Once the fire is established, the burning charcoal and gases liberate more combustible gases and volatiles from the wood. In many prior art heater designs, only a relatively small amount of the volatile matter is completely burned and a substantial amount of the combustion products exit the heater unburned or incompletely combusted and enter the atmosphere. The efficiency of wood and other solid fuel heaters depends largely upon the degree of combustion of the volatile products and prior art heaters have been provided with a means for introducing a secondary air supply which causes a more complete combustion process to occur. Examples of such heaters are disclosed in U.S. Pat. Nos. 742,108, 4,047,515, 4,078,541, 4,194,487, 4,201,186 and 4,206,743.

The efficiency of wood and other solid fuel heaters also depends upon the degree to which heat from the combustion of the fuel is transferred to the air or other fluid to be heated. Prior art heat exchange units for heaters are known which comprise a plurality of generally cylindrical tubes through which air is passed and heated. Examples are disclosed in U.S. Pat. Nos. 406,955 and 1,400,299. However, the prior art heat exchange systems for heaters are inefficient and a large percentage of the heat is lost. In heaters with a secondary air supply system, the secondary air supply has been introduced at some point or points remote from the heat exchange unit. In doing so, there is a large efficiency loss.

It is also known in the art to provide a heater with a magazine-type feeding arrangement for the wood or other solid fuel. In such heaters, large supplies of solid fuel such as wood may be supplied above the combustion area and fed toward the combustion area by means of gravity. U.S. Pat. Nos. 2,469,639, 4,194,487 and 4,201,186 disclose examples of such heaters.

The aforementioned and other deficiencies and disadvantages of the prior art heaters have long been recognized by those skilled in this art. However, an entirely satisfactory alternative thereto was not available prior to the present invention in spite of the long existing and great need therefor.

THE SUMMARY OF THE INVENTION

The present invention overcomes the aforementioned and other disadvantages and deficiencies of the prior art. This is accomplished by providing a heater characterized by the novel and improved design described and claimed hereinafter.

A heater is disclosed for the combustion of carbonaceous fuels which includes a casing which surrounds and contains the fuel such as wood prior to and during combustion and a heat exchanger of unique design which is positioned within the casing. In one preferred embodiment, the heat exchanger comprises a larger passageway for air having the general cross-sectional configuration of an inverted U, which effectively surrounds a smaller generally cross-sectionally U-shaped passageway for air. A channel for combustion gases produced in the heater is formed by these two passageways and leads the gases after substantially complete combustion to an exhaust port at the back of the heater. Other passageways for air may also be provided in the heat exchanger which serve additionally to baffle the combustion gases around the heat exchanger. In operation, air is forced into the passageways of the heat exchanger by means of a fan, whereupon the air is heated and blown out through the front of the heater.

The efficiency of the heater may be increased by providing an improved system for supplying pre-heated secondary air for more complete combustion of partially combusted fuel in close proximity to the heat exchanger. A secondary air source is drawn into the heater via a tube which extends around the periphery of the bottom of the firebox, whereupon the secondary air supply is led vertically through a conduit which then extends horizontally across the entire length of the bottom of the heat exchanger. The horizontal extension of the conduit has a series of discharge holes, so that air drawn into the secondary air supply system is discharged near the heat exchanger whereupon the secondary air supply causes combustion gases to fully burn close to the heat exchanger.

The heater is preferably of the self-feeding type and, in this embodiment, the casing may be generally cylindrical and the heat exchanger is approximately centrally located within the casing whereby it extends generally along the casing axis and is spaced a substantial distance from the casing wall. A substantial portion of the heat exchanger is preferably curved to further lessen the likelihood that solid fuel will be constricted and possibly not feed to the combustion zone.

THE BRIEF DESCRIPTION OF THE ACCOMPANYING DRAWINGS

The invention will be described hereinafter in greater particularity with reference to the presently preferred embodiments thereof illustrated in the accompanying drawings, wherein:

FIG. 7 is a top view of the secondary air supply system of the heater of the invention; and FIG. 8 is a side view of the secondary air supply system of FIG. 7.

Figure 1:
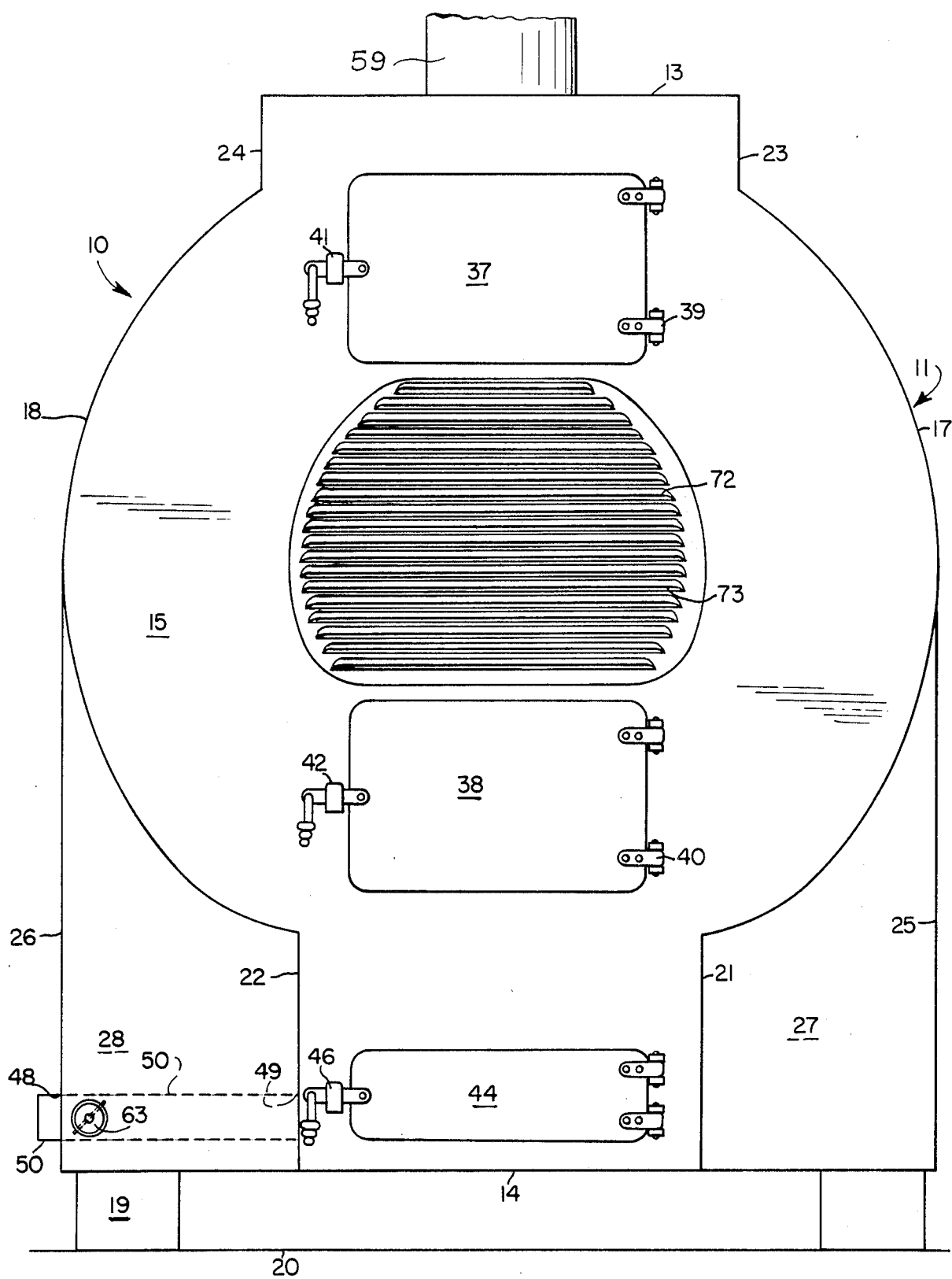
FIG. 1 is a front view of the heater of the invention.
Figure 2:
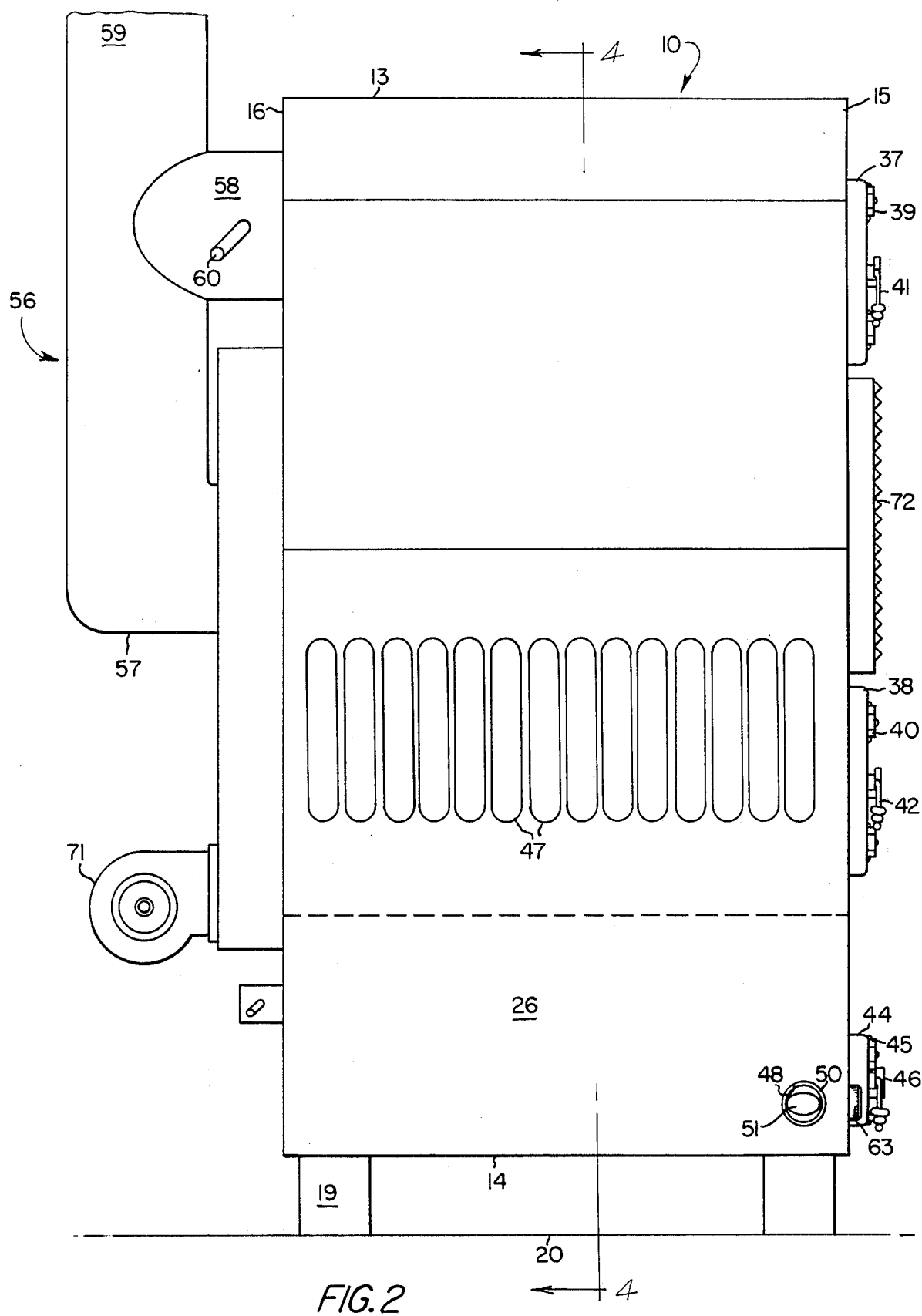
FIG. 2 is a side view of the heater of the invention.

THE DETAILED DESCRIPTION OF THE INVENTION INCLUDING THE PRESENTLY PREFERRED EMBODIMENTS THEREOF

Referring now to FIGS. 1-5, 7 and 8 of the drawings, the heater generally designated as 10 comprises a plurality of cooperating cast iron, steel, or other suitable metallic or heat resistant walls which are arranged in spaced relationship and integrally constructed to define a generally cylindrical wall structure 11 and enclosure 12 for burning combustible fuels. The wall structure 11 includes flat horizontally extending and transversely extending top wall 13 and bottom wall 14, transversely extending upright front wall 15 and back wall 16, and spaced left and right longitudinally extending generally arcuate upright side walls 17 and 18, respectively. Bottom wall 14 rests upon legs 19 and supports the heater 10 in an elevated position above surface 20. The arcuate side walls 17 and 18 include upright longitudinally extending spaced left and right lower extensions 21 and 22, respectively, which are joined at their lower ends to the upper surface of bottom wall 14 at points substantially equidistant from the outer side edges thereof. The side walls 17 and 18 also include upright longitudinally extending spaced left and right upper extensions 23 and 24 which are joined at their upper ends to the left and right side edges, respectively, of top wall 13.

The arcuate side walls 17 and 18 are braced or stabilized in their desired positions by left and right longitudinally extending upright side walls 25 and 26, respectively. The lower end of wall 25 is joined to the left edge of bottom plate 14 and extends upward therefrom to substantially the maximum outer position reached by wall 17 and is joined thereto. Similarly, the lower end of wall 26 is joined to the right edge of bottom plate 14 and extends upward therefrom to substantially the maximum outer position reached by wall 18 and is joined thereto. The front wall 15 extends transversely across the front ends of walls 13, 14, 17, 18, 25 and 26 and extensions 21-24, and is joined thereto. Similarly, the back wall 16 extends transversely across the rear ends of walls 13, 14, 17, 18, 25 and 26 and extensions 21-24, and is joined thereto.

The above described structure results in the formation of a generally cylindrical enclosure 12 for burning combustible fuels. The structure also results in the formation of auxiliary left and right longitudinally extending enclosures 27 and 28 which are outside of enclosure 12 and not in communication therewith, and thus are not actively involved in the combustion of the fuel. The preferred fuel is usually wood or other solid fuels such as coal, but normally liquid or gaseous fuels may be burned such as fuel oil, kerosene, natural gas, liquified petroleum gases, and the like. The combustion of wood will be described hereinafter for purposes of illustration.

Figure 4:
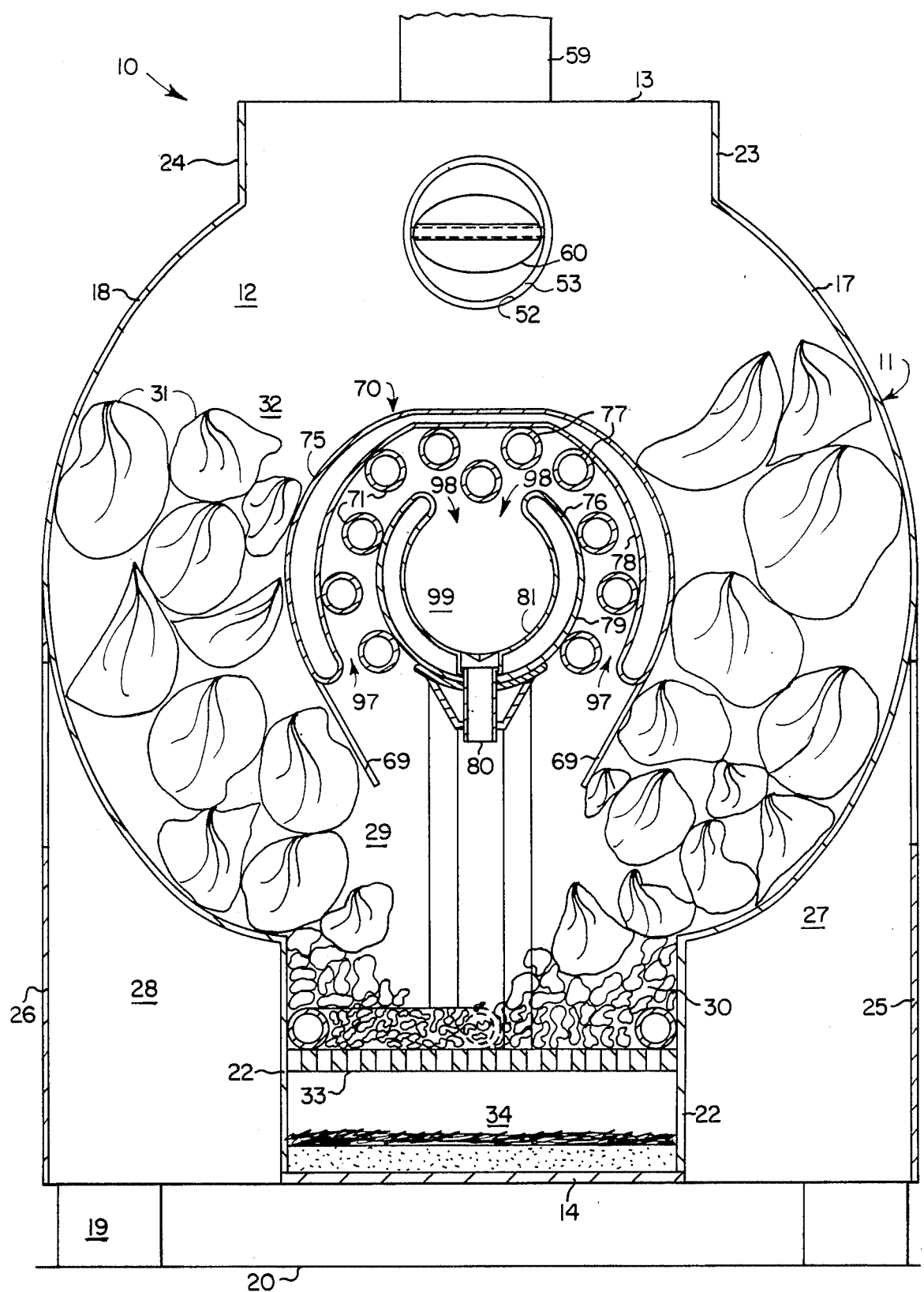
FIG. 4 is a transverse cross-sectional view of the heater of FIG. 3 taken along the Line 4—4 of FIG. 2 which further illustrates the heat exchanger and manner in which wood is loaded and burned therein.

As is best seen in FIG. 4, the enclosure 12 is loaded with longitudinally extending wood logs 31. The upper portion of enclosure 12 serves as a wood storage and drying zone 32 wherein it is conditioned for efficient burning in combustion zone 29 and especially at the relatively high combustion temperatures existing in firebox 30. The wood feeds downward by gravity from zone 32 into the upper portion of zone 29, and then into firebox 30 where it is burned to produce hot combustion gases and ashes. A grating 33 is provided adjacent the lowermost portion of firebox 30 through which the ashes pass into ash pit 34.

The front wall 15 has formed therein an upper loading opening 35 and a lower loading opening 36 through which wood 31 is introduced into the enclosure 12. The openings 35 and 36 are provided with upper and lower normally closed loading doors 37 and 38, respectively, which may be opened when desired to permit access to enclosure 12 and enable the wood 31 to be loaded. The doors 37 and 38 are hingedly attached to front wall 15 by means of hinges 39 and 40 and have engagable and disengagable locking means 41 and 42, respectively, thereby allowing the normally closed and locked doors 37 and 38 to be unlocked and opened for wood loading purposes and thereafter closed and re-locked. The front wall 15 also has an opening 43 formed therein at the level of ash pit 34 and a normally locked door 44 is provided therefor to permit access to ash pit 34 when cleaning is required. The door 44 is similarly hingedly attached to wall 15 by hinge 45 and has an engagable and disengagable locking means 46, whereby the normally locked door 44 may be unlocked and opened for ash removal purposes, and then closed and re-locked. A smoke baffle 62 may be provided above loading door 35 to prevent smoke from entering the room when door 35 is open for wood loading purposes. The corners of doors 35, 36 and 44 are preferably rounded as shown to control or prevent warping.

Each of the side walls 25 and 26 is provided with one or more openings 47 which allow direct communication between the auxiliary enclosures 26 and 27 and the ambient atmosphere. The openings 47 permit free circulation of gases between the enclosures 26 and 27 and the ambient atmosphere and thereby equalize the pressure. The sidewall 26 and the lower extension 22 are provided with openings 48 and 49, respectively, at the level of ash pit 34 which receive the ends of primary air conduit 50. The conduit 50 is in communication with the ambient atmosphere on its outer end and with the interior of ash pit 34 on its inner end and provides a primary source of oxygen-containing gas such as air for combustion of wood 31. The air flows through conduit 50 at a rate controlled by damper 51 and damper adjuster 63 into ash pit 34. Thereafter, the air flows upward through the openings in grating 33 into the firebox 30 and combustion zone 29.

The back wall 16 has an upper exhaust port 52 and a lower exhaust port 54 formed therein which receive exhaust conduits 53 and 55, respectively, for withdrawing waste relatively cool gaseous combustion products from enclosure 12. The stove pipe assembly 56 includes a lower elbow section 57 which is in communication with exhaust port 54, an upper short connecting section 58 which is in communication with exhaust port 52, and a main section 59 which is in communication with both elbow 57 and connecting section 58. A normally closed adjustable damper 60 is positioned in connecting section 58. This arrangement allows the connecting section 58 to be closed off at all times except when the upper loading door 37 is open and the waste combustion products are normally withdrawn via exhaust conduit 55. However, when the upper loading door 37 is open, then the damper 60 is also open to allow waste combustion gases to be withdrawn via exhaust conduit 53 and thereby avoid irritating smoke being released into the ambient atmosphere.

A heat exchange unit 70 extends longitudinally throughout substantially the length of the enclosure 12 from the back wall 16 to the front wall 15 and it is spaced approximately centrally or axially therein with respect to the spaced arced portions of arcuate side walls 17 and 18. The heat exchange unit 70 is comprised of a plurality of passageways or conduits to be described more fully hereinafter through which relatively cool air is forced by means of a fan 71 from the back of the heater 10. The cool air is warmed while passing through the passageways, and then the warm air exits therefrom into the ambient atmosphere via the opening 74 in the front wall 15. If desired, a louvered grill 72 having movable louvers 73 may be attached to the front wall 15 in the vicinity of opening 74 to cover the hot ends of the passageways of heat exchange unit 70. The grill 72 permits the heated air flowing from the passageways via opening 74 to be directed in a desired direction while also covering the end of the hot heat exchange unit 70. In an alternative embodiment (not shown), a duct system may be employed to take the heated air flowing from the passageways and direct it to other rooms, living quarters or areas located away from heater 10.

Figure 3:
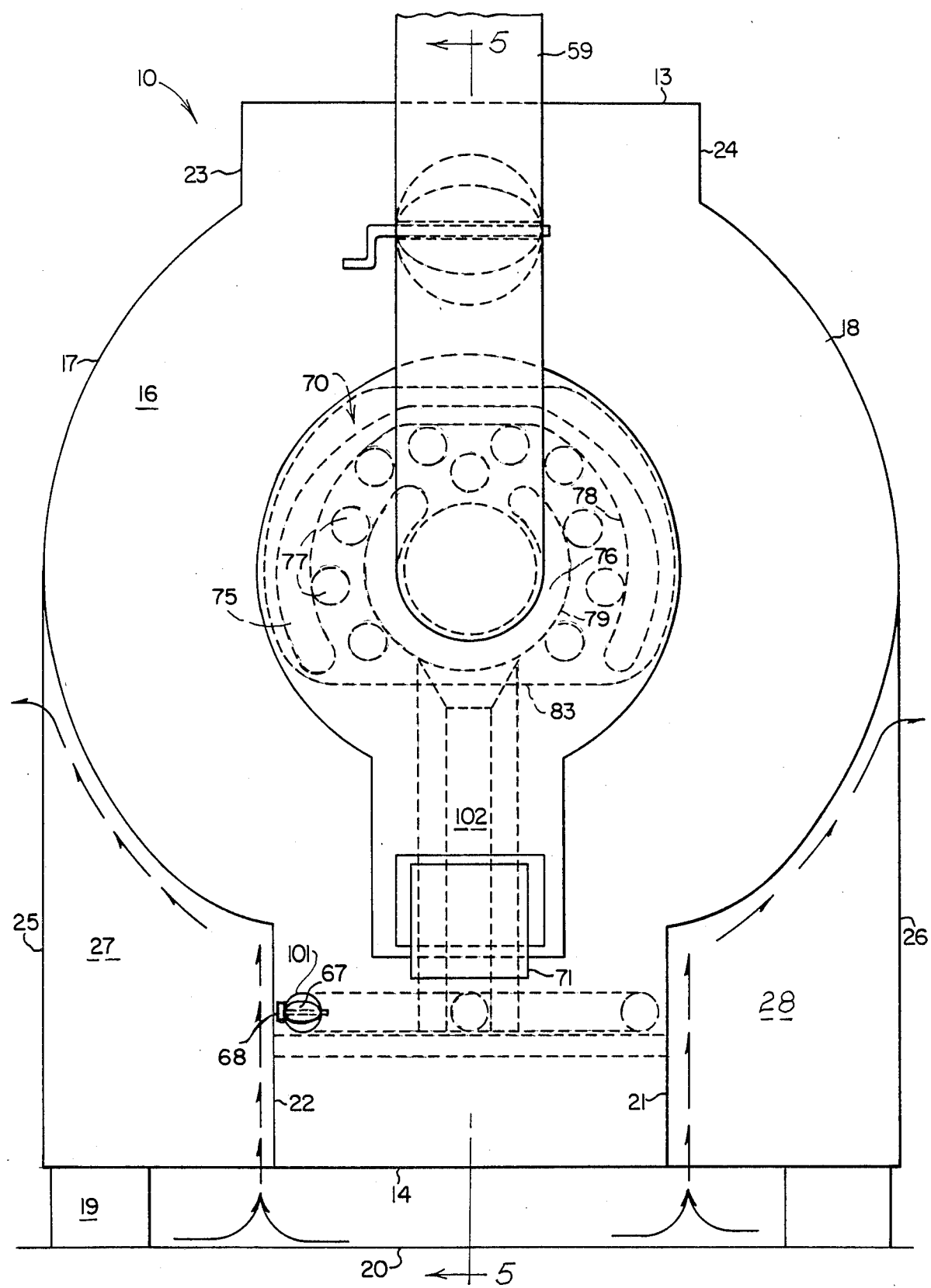
FIG. 3 is a rear view of the heater of the invention showing one presently preferred variation of the heat exchanger therefor in phantom line.

In one preferred embodiment of the heat exchange unit 70, which is shown in FIGS. 2-5, there is provided a large heat conductive passageway or conduit 75 for air which effectively surrounds the various other smaller heat conductive passageways or conduits discussed below. This large passageway 75 is preferably, but not necessarily, in the general cross-sectional shape of an inverted U. Effectively surrounded by the large passageway 75 is a smaller passageway for air 76 which is preferably, but not necessarily, generally cross-sectionally upright U-shaped. A plurality of passageways for air 77 which are preferably, but not necessarily, generally cylindrical may be provided which are located between the smaller U-shaped passageway 76 and the larger inverted U-shaped passageway 75. These generally cylindrical passageways 77 may be arranged as illustrated in staggered relationship between the inner peripheral surface 78 of inverted U-shaped passageway 75 and the outer peripheral surface 79 of upright U-shaped member 76 whereby they serve as baffles to agitate gases flowing thereover as discussed hereinafter. All air passageways 75, 76 and 77 of the heat exchange unit 70 extend throughout substantially the entire length of the enclosure 12 as described more fully hereinafter and maintain a constant or relatively constant cross-sectional configuration. Although eleven cylindrical passageways 77 are shown in FIGS. 3 and 4, more or less thereof may be provided as desired. The U-shaped passageway 76 is provided with a drain pipe 80 which extends downward therethrough from the inner peripheral surface 81 and discharges into the firebox 30 at a point substantially below the outer peripheral surface 79. The drain pipe 80 is preferably located approximately equidistant from the ends of passageway 76 and the inner peripheral surface 81 thereof is sloped downward from either end to assure complete drainage of condensates such as creosote into firebox 30 for burning.

Figure 5:
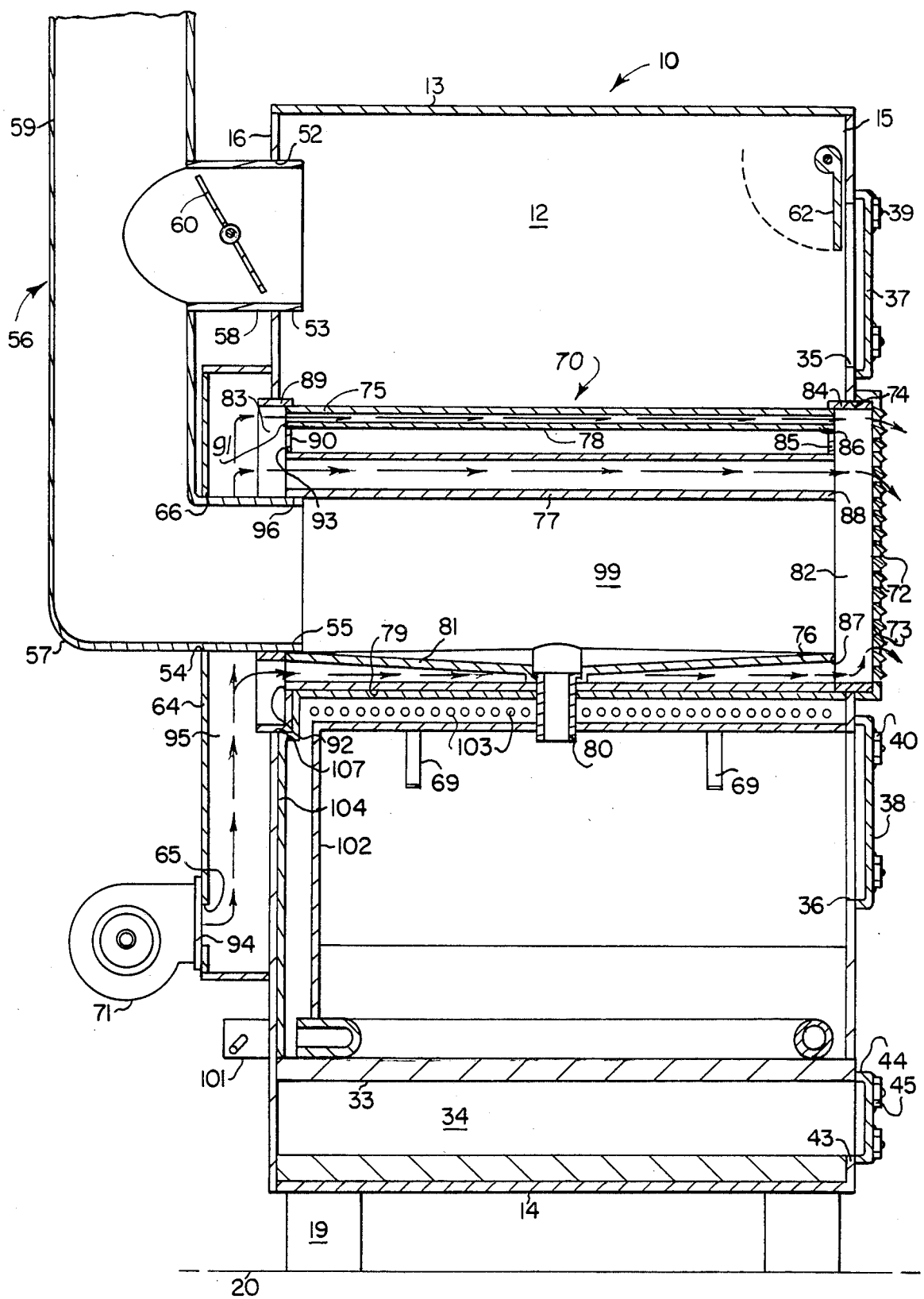
FIG. 5 is a longitudinal cross-sectional view of the heater of FIG. 3 taken along the Line 5—5 of FIG. 3.

As is best seen in FIG. 5, the front and back ends of passageways 75, 76 and 77 are supported by support means 82 and 83 carried by walls 15 and 16, respectively, and hot combustion gases are free to pass upward and rearward therebetween toward exhaust conduit 55 as shown in heat exchange relationship with cool air flowing therethrough toward front opening 74. The front support means 82 includes a flanged perimeter 84 having a plate 85 extending thereacross which is provided with a plurality of openings 86, 87 and 88 for receiving passageways 75, 76 and 77, respectively. The perimeter 84 is shaped to conform with front opening 74, and the flange portion thereof is welded or otherwise joined in air tight relationship to the inner surface of wall 15 adjacent opening 74. The passageways 75, 76 and 77 pass through openings 86, 87 and 88, respectively, as shown and are welded or otherwise joined in air tight relationship to plate 85. The back support means 83 includes a flanged perimeter 89 having a plate 90 extending thereacross which is provided with a plurality of openings 91, 92, 93 and 96 for receiving passageways 75, 76 and 77 and exhaust conduit 55, respectively. The perimeter 89 is shaped to conform with back opening 107 in wall 16, and is welded or otherwise joined in air tight relationship to wall 16 adjacent opening 107. The flanged cowling 64 has openings 65 and 66 formed therein and is shaped to provide an internal space or manifold area 95 which is sufficiently large and so arranged as to embrace the ends of passageways 75, 76 and 77 and surround the exhaust conduit 55, and the flange portion thereof is welded or otherwise joined in air tight relationship to wall 16. The passageways 75, 76 and 77 pass through the openings 91, 92 and 93, respectively, so as to be in communication with manifold area 95, and exhaust conduit 55 passes through opening 96 a short distance into enclosure 12, and all are welded or otherwise joined to plate 90 in air tight relationship. The exhaust conduit 55 also passes through opening 66 and is welded or otherwise joined to cowling 64 in air tight relationship. The air outlet 94 for fan 71 is mounted around opening 65 in air tight relationship and so as to discharge air through opening 65 into the manifold area 95 as shown in FIG. 5. This construction and arrangement of the support means 82 and 83 assures that no irritating combustion gases escape into the ambient atmosphere in the vicinity of the heater 10. Hot combustion gases produced in firebox 30 are capable of flowing upward in the spaces between air passageways 75, 76 and 77 toward the center of the heat exchange unit 70, i.e., into the space embraced by the inner peripheral surface 78 of U-shaped member 75. The U-shaped members 75 and 76 and the generally cylindrical passageways 77 are sized and arranged in such a manner that the spaces or areas 97 through which hot combustion gases flow near the lowest portion of the heat exchange unit 70 are preferably larger than the spaces or areas 98 through which hot combustion gases flow near the top of unit 70. Thus the flow of hot combustion gases may be restricted and controlled as the gases flow from firebox 30 into the center 99 of the heat exchange unit 70 since the effective area leading to the center 99 is progressively decreased. The fan 71 is mounted on the cowling 64 and blows cool air through outlet 94 and opening 65 into manifold area 95, then through air passageways 75, 76 and 77, and finally out the front opening 74. The cool air passes in heat exchange relationship with the hot combustion gases and is warmed, and the hot combustion gases are cooled. As is best seen in FIG. 5, the inner end of exhaust conduit 55 extends into the back end of U-shaped member 76. The exhaust conduit 55 is in communication with the area 99 embraced by the inner peripheral surface 81 and the relatively cool combustion gases flowing therein are withdrawn and discharged to the atmosphere via exhaust port 54, exhaust conduit 55 and stove pipe assembly 56. As is best seen in FIGS. 4 and 5, a spaced pair of rods 69 project downward from heat exchanger 70 for the purpose of preventing wood from collecting thereunder and reducing the efficiency of combustion.

Figure 6:
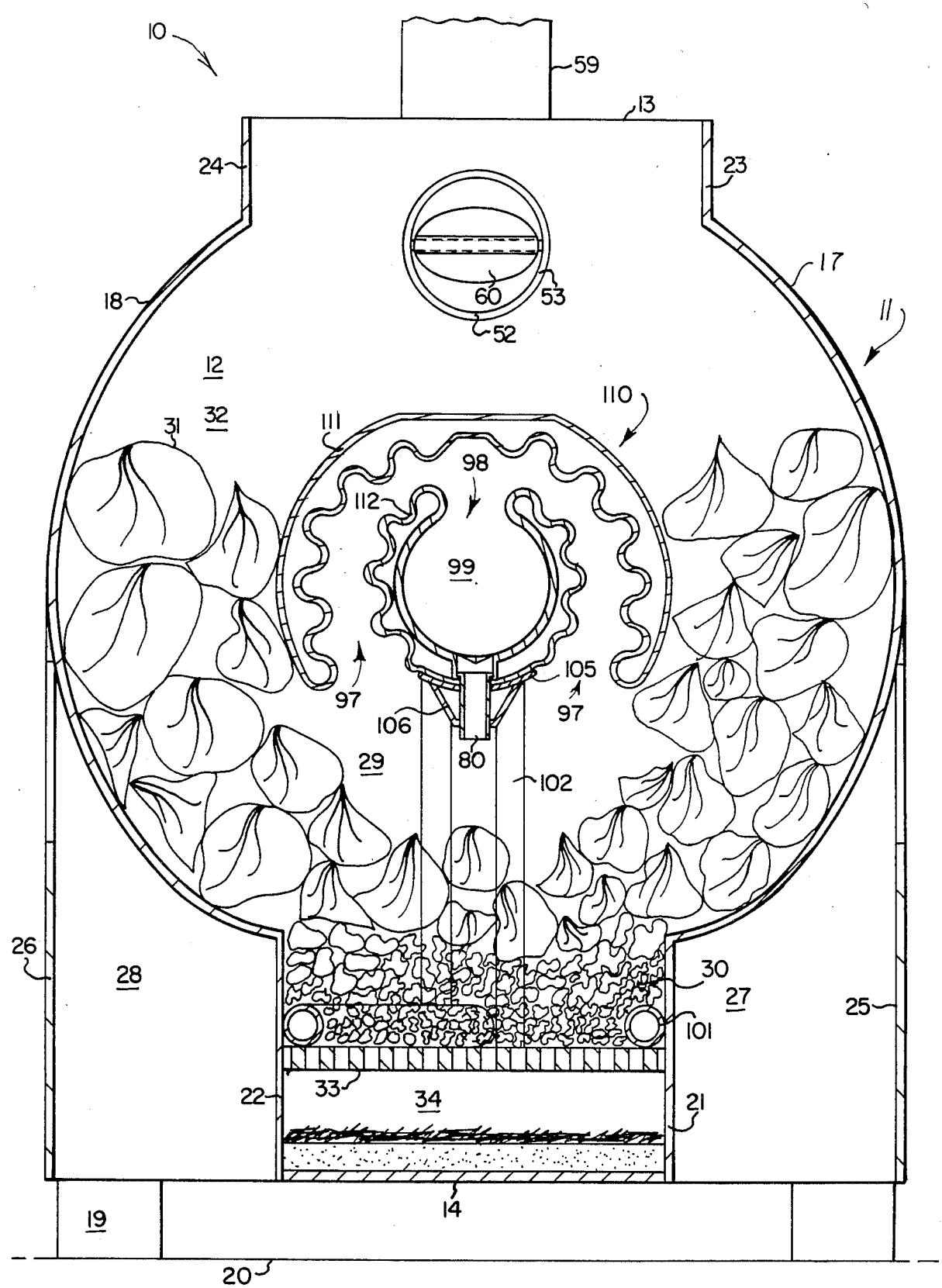
FIG. 6 is a transverse cross-sectional view of the heater of the invention similar to FIG. 4 but showing a second variation of the heat exchanger.

The heater of FIG. 6 is of similar design and construction to that of FIGS. 1–5, 7 and 8 with the exception of the configuration of the heat exchange unit 70. In the embodiment of the heat exchange unit 110 shown in FIG. 6, there is provided, as is shown therein, a large outer passageway for air 111 which is larger and effectively surrounds a smaller inner passageway for air 112. The outer passageway for air 111 has a cross-sectional shape generally resembling an inverted U, while the smaller inner passageway for air 112 has a generally upright U-shaped cross-sectional shape. The smaller U-shaped passageway 112 preferably has a smooth cylindrical inner peripheral surface and a corrugated outer peripheral surface. The larger U-shaped passageway 111 preferably has a corrugated cylindrical inner peripheral surface and a smooth outer peripheral surface. Both air passageways 111 and 112 rest horizontally within the heater. The edges of the heat exchange unit which encounter the most intense heat are thus corrugated, and this increases the efficiency of the heat exchange unit by increasing the surface area of the passageways which are being exposed to the most intense heat. The corrugated surfaces also serve to baffle and agitate the air passing into the heat exchange unit. The remainder of the structure for heat exchanger 110 and the associated apparatus are as previously described for FIGS. 1–5, 7 and 8 and reference may be made thereto. It will be apparent that air passageways 111 and 112 of FIG. 6 have been substituted for air passageways 75, 76 and 77 of FIGS. 1–5, 7 and 8, and in general the operation thereof is substantially the same.

There is provided in the heater 10 of the invention a secondary air supply that increases the efficiency greatly. Air enters the secondary air supply through the back wall 16 via pipe 101 which is preferably cylindrical. The pipe 101 is located at the bottom of the firebox 30 and it extends around the periphery of the bottom of the firebox 30. The pipe 101 begins at the back 16 at one side of the firebox 30, extends to the front of the firebox 30 along the same side, extends perpendicularly and continues across the front of the firebox 30, extends perpendicularly again and continues along the opposite side toward the back of the firebox 30, extends perpendicularly and continues approximately half way across the back side of the firebox 30, whereupon it extends perpendicularly toward the back wall of the heater and empties into secondary air passageway 102. The second air passageway 102 extends vertically along the back wall 16. Preferably, a layer of asbestos 104 or other insulation is placed between the secondary air passageway 102 and the back wall 16 of the heater. The secondary air passageway 102, after continuing vertically along the back wall 16, then extends perpendicularly and continues horizontally from the back 16 to the front wall 15. This horizontally extending secondary air passageway 102 is arranged such that the top of the secondary air passageway 102 is in close proximity or in contact with the smaller cross-sectionally U-shaped passageway for air 76 or 112 of the heat exchange unit 70 or 110, respectively. Although the secondary air passageway 102 may have any desired cross-sectional configuration, it is preferably generally trapezoidal-shaped, with the longer parallel side being curved and in close proximity with the heat exchange unit 70. The two non-parallel sides of the trapezoidal-shaped horizontally-extending secondary air passageway 102 have vent ports 103 along the entire length thereof. A layer of asbestos 105 may also be placed between air passageway 102 or 103 and heat exchange unit 70 or 110.

The operation of the heater 10 shown in FIGS. 1–5, 7 and 8 is as described hereinafter. A limited amount of fuel such as wood 31 is initially passed through the lower loading door 38 in the front 15 and placed in the firebox 30. The damper 60 is opened. A primary source of air required for the combustion process to take place enters the generally cylindrical enclosure 12 through the metal side 18. A damper 51 communicates with the ambient atmosphere and allows air to pass through pipe 50 into the ash pit 34 and upward into firebox 30. Once a fire involving this limited amount of wood has been started and the chances of undesired extinguishing of the fire have decreased, a larger load of wood is placed into the generally cylindrical enclosure 12 through upper loading door 37. The wood is preferably loaded such that the logs lie approximately horizontally in the heater to aid in the automatic feeding of the wood by gravity. The loading door 37 is then sealed to prevent combustion in the upper part of the heater. Hot combustion gases escape from the firebox 30 and move in an upward direction. From the back 16 of the heater, fan 71 forces air to be heated through the passageways 75, 76 and 77 for air of heat exchange unit 70, and through air passageways 111 and 112 for heat exchange unit 110.

A secondary supply of air enters the heater through pipe 101 from the back 16. The secondary supply of air flows in the pipe 101 around the periphery of the bottom of firebox 30 and in so doing is pre-heated. After flowing through the entirety of pipe 101, the pre-heated secondary air then enters secondary air passageway 102. It moves vertically inside the secondary air passageway 102 until such time as it reaches the horizontally extending portion 106 which extends perpendicularly therefrom. Vent ports 103 located along the entire length of the horizontally extending portion 106 allow the pre-heated secondary air to escape at the opening where gases from the firebox 30 enter the channel formed by the cross-sectionally inverted U-shaped passageway for air 75 and the cross-sectionally U-shaped passageway for air 76. The pre-heated secondary source of air from vent ports 103 travels toward the said channel and combines with the escaping gases from the firebox 30. The oxygen contained in the pre-heated secondary source of air causes the escaping gases to reburn at the entrance at the bottom of the heat exchange unit 70. Large amounts of heat are thus produced which cause the air going through the passageways 75, 76 and 77 in the heat exchange unit 70 to be heated further. The air is heated throughout the entire length of the heat exchange unit 70 by this reburning process since the secondary source of air is discharged along the entirety of the horizontally-extending secondary air passageway 102 and escaping gases are present along the entire length of the heater.

The plurality of generally cylindrical passageways for air 77 shown in the embodiment of the heat exchange unit 70 illustrated in FIGS. 1-5 and the waves or corrugations in the passageways for air 111 and 112 shown in FIG. 6 serve to baffle the exhaust gases as they travel toward the center of the heat exchange unit 70 or 110 while moving toward exhaust port 55 before exiting, and thus serve to increase the efficiency of the heat transfer. The exhaust gases travel toward the back 16 of the heater where they exit through exhaust port 55, which preferably leads to a chimney. The heated air in the heat exchange unit 70 travels toward the front 15 of the heater and exits therethrough, whereupon it is used to heat the room or can be directed by means of ducting to other rooms or areas.

The heater is designed so as to allow for the self-feeding of the solid fuel such as wood from the drying zone 32 into the firebox 30. A supply of wood or other solid fuel is placed in the generally cylindrical enclosure 12 through upper loading door 37. This supply of wood or other solid fuel may surround the heat exchange unit 70 or 110 when the heater 10 is loaded with fuel. The generally cylindrical enclosure 12 above the firebox 30 acts as a storage area for the wood or other solid fuel prior to combustion in the firebox 30. The upper portion 32 of the supply of wood or other solid fuel is in a remote and shielded position with respect to the heat generated in the firebox 30 and also with respect to the heat generated at the opening in the bottom of heat exchange unit 70 or 110. The wood or other solid fuel supply will lose moisture gradually while in this storage area. The slow removal of the moisture at relatively low temperatures while in the storage area cures the wood and prepares it to ignite and burn more efficiently once it reaches high temperatures in or near the firebox 30. The slow removal of moisture or curing of the solid fuel also prevents large amounts of volatile gases from being carried away with steam. As the wood or other solid fuel is combusted in the firebox 30, the volume occupied by the fuel decreases. As a result, wood or other solid fuel tends to move from the top of the generally cylindrical enclosure 12 which acts as a storage area toward the firebox 30 due to a gravitational feeding arrangement. Wood or other solid fuel does not tend to jam in the heater since all surfaces of the heater that contact it are smooth and the volume of space between the wall of the generally cylindrical enclosure 12 and the heat exchange unit 70 or 10 does not become constricted as the fuel moves from the top to the bottom.

It will be recognized by those skilled in this art that the pipe 101 may be provided with a damper 67 and damper control 68 to control the rate of flow of the secondary air supply. Also, the rods 69 provide a means of increasing the efficiency of the stove 10, and are not necessary for operation at lower rates of efficiency. The rods 69 have an important additional purpose. When the wood or other fuel 31 in the firebox 30 has burned for a sufficient period of time, coals and partially burned fuel will accumulate in the firebox 30. This will cause the wood 31 falling from the zone 32 to block or partially block the entrances to the firebox 30. The wood at the entrances to the firebox 30 will ignite and continue to burn in this position. This causes the combustible gases emitted in the storage area to be drawn through the hot coals or immediately thereabove, and to be heated to the combustion temperature whereby the hot gases are ignited when they come in contact with air. The wood 31 consumed at the entrances to the firebox 30 will fall and provide additional hot coals and charred wood to keep the fire in firebox 30 burning at the desired intensity as a general rule. If a more intense and hotter fire is desired, additional wood 31 may be stoked through door 38 from time to time as needed. This method of operation is especially useful in reducing creosote and improving the efficiency of the stove 10 when a low intensity or slow burning fire is desired. If desired, the rods 69 may be hinged so as to allow them to be drawn upward out of the path of the wood 31, or the rods 69 may be eliminated entirely. In either instance, the wood 31 will not contact the rods 69 and will flow freely into the firebox 30 until the zone 32 is substantially empty.

The foregoing detailed description and the accompanying drawings are for purposes of illustration only and are not intended to be limiting to the spirit or scope of the appended claims.

I claim:

1. A heater for burning combustible fuel comprising:

heat resistant wall means arranged in spaced relationship to define an enclosure for burning combustible fuel;

said enclosure including a combustion zone having a firebox portion wherein said combustible fuel is burned in the presence of oxygen-containing gas to produce combustion products comprising hot gaseous combustion products;

means for supplying combustible fuel to the heater including an opening in said wall means through which said combustible fuel is introduced into said enclosure for burning in the firebox portion of said combustion zone;

means for supplying oxygen-containing gas to the heater including an opening in said wall means through which a primary source of oxygen-containing gas is introduced into said enclosure for burning combustible fuel in the firebox portion of said combustion zone;

heat exchange means within said enclosure wherein relatively cool fluid to be heated is heat exchanged with said hot gaseous combustion products to thereby produce relatively warm fluid and relatively cool gaseous combustion products;

means for removing waste combustion products from said enclosure, said means for removing waste combustion products comprising conduit means for withdrawing said relatively cool waste gaseous combustion products including an exhaust port in said wall means through which said relatively cool gaseous combustion products are withdrawn from said enclosure;

said heat exchange means comprising first and second conduit means for fluid to be heated having elongated heat resistant and heat conductive first and second wall means arranged in spaced relationship to define first and second elongated passageways therethrough respectively for fluid to be heated, each of said first and second conduit means having a transverse cross-sectional configuration such that the external dimensions of their respective said first and second wall means and the internal dimensions of their respective said first and second passageways have markedly greater widths than thicknesses, the said first and second conduit means having longitudinally extending side edge portions and their respective said transverse cross-sectional configurations being such that said longitudinal side edges are folded generally toward each other but not into an abutting relationship to thereby embrace and form therebetween first and second respectively longitudinally extending elongated heat exchange passageways for hot gaseous combustion products having respectively longitudinally extending elongated first and second openings which allow hot gaseous combustion products to flow into said first and second heat exchange passageways;

said first conduit means having a substantially larger transverse cross-sectional configuration than said second conduit means and said second conduit means being positioned within the said first heat exchange passageway for hot gaseous combustion products formed by said first conduit means, the outer peripheral wall of said second conduit means being in spaced relationship with respect to the inner peripheral wall of said first conduit means, said first opening for hot gaseous combustion products being positioned at a point remote from said second opening for hot gaseous combustion products whereby hot gaseous combustion products pass consecutively from the firebox portion of said combustion zone through the said first opening into the said first heat exchange passageway for hot gaseous combustion products and then through said second opening into said second heat exchange passageway for hot gaseous combustion products in heat-exchange relationship with cool fluid to be heated flowing through said first and second passageways in said first and second conduit means respectively;

said second heat exchange passageway for hot gaseous combustion products formed by said second conduit means being in communication with said exhaust port and said conduit means for withdrawing relatively cool waste gaseous combustion products from said enclosure; and means for passing relatively cool fluid to be heated through the first and second passageways of said first and second conduit means whereby said cool fluid is passed in heat exchange relationship with hot gases flowing in said heat exchange passageways for hot gaseous combustion products formed by said first and second conduit means and is heated to a higher temperature and said hot gaseous combustion products are cooled to a lower temperature before withdrawal of the resultant relatively cool waste gaseous combustion products from said enclosure through said exhaust port.

2. The heater of claim 1 wherein the said heat exchange means extends substantially horizontally through the central portion of the said enclosure and above the said firebox in the combustion zone.

3. The heater of claim 2 wherein substantially the lowermost portion of the inner periphery of said second conduit means is sloped toward a drain conduit for liquid condensate collecting therein, the entrance end of said drain conduit being located at a point remote from the ends of said second conduit means and the exit end thereof discharging downward into the said firebox of the combustion zone whereby combustible condensate collecting in said second conduit means is withdrawn and discharged into the said firebox of the combustion zone and burned.

4. The heater of claim 1 wherein said enclosure is generally cylindrical and includes cooperating heat resistant arcuate side walls.

5. The heater of claim 4 wherein the distance between said heat exchange means and said arcuate side walls is substantially constant or increases from the top to bottom thereof whereby solid fuel feeds downward by gravity between said heat exchange means and said arcuate side walls into the firebox of said combustion zone.

6. The heater of claim 1 wherein a fan means is provided for forcing air through the said first and second conduit means.

7. The heater of claim 1 wherein said first conduit means comprises an inverted first generally U-shaped conduit means, said second conduit means comprises an upright second generally U-shaped conduit means, and said upright second generally U-shaped conduit means has a substantially smaller cross-sectional configuration than said inverted first generally U-shaped conduit means and is positioned therein in spaced relationship.

8. The heater of claim 7 wherein agitation means is provided adjacent the outer periphery of said second U-shaped conduit means or adjacent the inner periphery of said first U-shaped conduit means to agitate hot gaseous combustion products flowing therebetween.

9. The heater of claim 7 wherein a plurality of staggered generally cylindrical conduits are provided adjacent the outer periphery of said second U-shaped conduit means and adjacent the inner periphery of said first U-shaped conduit means to thereby agitate hot gaseous combustion products flowing therebetween.

10. The heater of claim 7 wherein a series of corrugations are provided along the inner periphery of said first U-shaped conduit means and adjacent the outer periphery of said second U-shaped conduit means to thereby agitate hot gaseous combustion products flowing therebetween.

11. The heater of claim 7 wherein said exhaust port is located adjacent one end of said second U-shaped conduit means.

12. A heater for burning combustible fuel comprising:
heat resistant wall means arranged in spaced relationship to define an enclosure for burning combustible fuel;

said enclosure including a combustion zone having a firebox portion wherein said combustible fuel is burned in the presence of oxygen-containing gas to produce combustion products comprising hot gaseous combustion products;

means for supplying combustible fuel to the heater including an opening in said wall means through which said combustible fuel is introduced into said enclosure for burning in the firebox portion of said combustion zone;

means for supplying oxygen-containing gas to the heater including an opening in said wall means through which a primary source of oxygen-containing gas is introduced into said enclosure for burning combustible fuel in the firebox portion of said combustion zone;

heat exchange means within said enclosure wherein relatively cool fluid to be heated is heat exchanged with said hot gaseous combustion products to thereby produce relatively warm fluid and relatively cool gaseous combustion products;

means for removing waste combustion products from said enclosure, said means for removing waste combustion products comprising conduit means for withdrawing said relatively cool waste gaseous combustion products including an exhaust port in said wall means through which said relatively cool gaseous combustion products are withdrawn from said enclosure;

said heat exchange means comprising first and second conduit means for fluid to be heated having elongated heat resistant and heat conductive first and second wall means arranged in spaced relationship to define first and second elongated passageways therethrough respectively for fluid to be heated, each of said first and second conduit means having a transverse cross-sectional configuration such that the external dimensions of their respective said first and second wall means and the internal dimensions of their respective said first and second passageways have markedly greater widths than thicknesses, the said first and second conduit means having longitudinally extending side edge portions and their respective said transverse cross-sectional configurations being such that said longitudinal side edges are folded generally toward each other but not into an abutting relationship to thereby embrace and form therebetween first and second respectively longitudinally extending elongated heat exchange passageways for hot gaseous combustion products having respectively longitudinally extending elongated first and second openings which allow hot gaseous combustion products to flow into said first and second heat exchange passageways;

said first conduit means having a substantially larger transverse cross-sectional configuration than said second conduit means and said second conduit means being positioned within the said first heat exchange passageway for hot gaseous combustion products formed by said first conduit means, the outer peripheral wall of said second conduit means being in spaced relationship with respect to the inner peripheral wall of said first conduit means, said first opening for hot gaseous combustion products being positioned at a point remote from said second opening for hot gaseous combustion products whereby hot gaseous combustion products pass consecutively from the firebox portion of said combustion zone through the said first opening into the said first heat exchange passageway for hot gaseous combustion products and then through said second opening into said second heat exchange passageway for hot gaseous combustion products in heat-exchange relationship with cool fluid to be heated flowing through said first and second passageways in said first and second conduit means respectively;

said second heat exchange passageway for hot gaseous combustion products formed by said second conduit means being in communication with said exhaust port and said conduit means for withdrawing relatively cool waste gaseous combustion products from said enclosure;

means for passing relatively cool fluid to be heated through the first and second passageways of said first and second conduit means whereby said cool fluid is passed in heat exchange relationship with hot gases flowing in said heat exchange passageways for hot gaseous combustion products formed by said first and second conduit means and is heated to a higher temperature and said hot gaseous combustion products are cooled to a lower temperature before withdrawal of the resultant relatively cool waste gaseous combustion products from said enclosure through said exhaust port; and means for providing a secondary source of oxygen-containing gas within said enclosure, said means for providing the secondary source of oxygen-containing gas comprising conduit means passing through an opening in said wall means that communicates on the outer end with a secondary source of oxygen-containing gas and having a plurality of outlets in its inner end positioned to discharge the oxygen-containing gas in close proximity to said heat exchange means whereby secondary burning of the combustible fuel occurs and additional heat is produced.

13. The heater of claim 12 wherein the said heat exchange means extends substantially horizontally through the central portion of the said enclosure and above the said firebox in the combustion zone.

14. The heater of claim 12 wherein said first conduit means comprises an inverted first generally U-shaped conduit means, said second conduit means comprises an upright second generally U-shaped conduit means, and said upright second generally U-shaped conduit means has a substantially smaller cross-sectional configuration than said inverted first generally U-shaped conduit means and is positioned therein in spaced relationship.

15. The heater of claim 14 wherein a plurality of staggered generally cylindrical conduits are provided adjacent the outer periphery of said second U-shaped conduit means and adjacent the inner periphery of said first U-shaped conduit means to thereby agitate hot gaseous combustion products flowing therebetween.

16. The heater of claim 14 wherein a series of corrugations are provided along the inner periphery of said first U-shaped conduit means and adjacent the outer periphery of said second U-shaped conduit means to thereby agitate hot gaseous combustion products flowing therebetween.

17. The heater of claim 14 wherein said exhaust port is located adjacent one end of said second U-shaped conduit means.

18. The heater of claim 12 wherein the distance between said heat exchange means and said arcuate side wall is substantially constant or increases from the top to bottom thereof whereby solid fuel feeds downward by gravity between said heat exchange means and said arcuate side walls into the firebox of said combustion zone.

19. The heater of claim 12 wherein a fan means is provided for forcing air through the said first and second conduit means.

20. The heater of claim 12 wherein said conduit means for providing a secondary source of oxygen-containing gas extends around the periphery of the said combustion zone, and then upwardly and horizontally until the outer end thereof is in close proximity to the bottom of the said heat exchange means.

21. The heater of claim 20 wherein the portion of the said conduit means for providing a secondary source of oxygen-containing gas which extends upwardly is in close proximity with said wall means.

22. The heater of claim 20 wherein said horizontally extending portion of the conduit means extends beneath the said heat exchange means in close proximity thereto for substantially its entire length and has spaced outlets therein for discharging said oxygen-containing gas along substantially its entire length.

* * * * *